Dec. 10, 1946.  J. KEREZI ET AL  2,412,406
AIRCRAFT LANDING WHEEL
Filed July 10, 1944
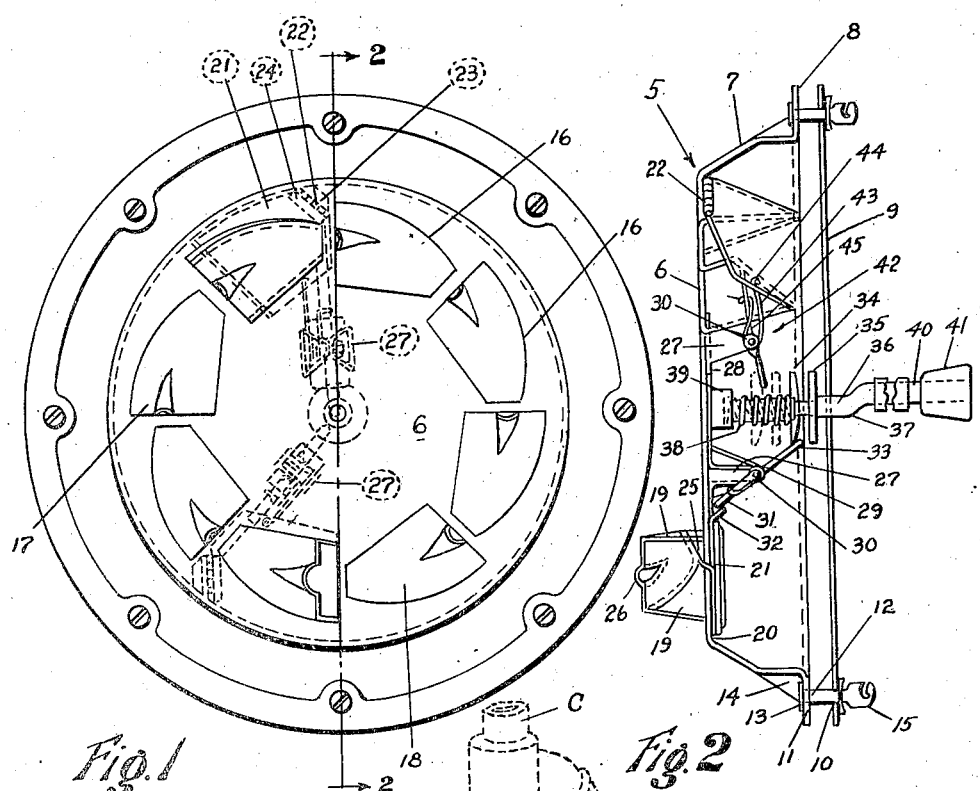
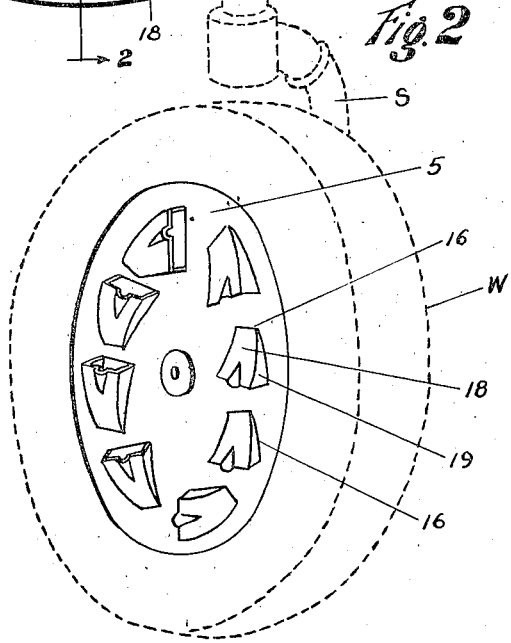
INVENTOR.
JOSEPH KEREZI
LYNN C. MAYSILLES
BY Barthel + Bugbee Patented Dec. 10, 1946

2,412,406

UNITED STATES PATENT OFFICE 2,412,406

AIRCRAFT LANDING WHEEL

Joseph Kerezi, Detroit, and Lynn C. Maysilles, Wayne, Mich.

Application July 10, 1944, Serial No. 544,230

10 Claims. (Cl. 244—103)

This invention relates to aircraft, and more particularly, to aircraft landing gear and the wheels thereof, to facilitate the easy landing and take-off by imparting a rotative movement to the wheels of the landing gear during ascending and descending operations.

The primary object of the invention is to provide a projectible and retractable vane member which will be presented in the slipstream of the plane so as to cause the wheels to be rotated in a direction to track on the ground surface during initial contact so as to prevent and reduce friction ordinarily arising between the wheels and ground surface when the landing wheels are not rotating during the initial contact with the landing surface.

Another object of the invention is to provide a device of the above-mentioned character which may be readily attached to the conventional landing wheels of present-day aircraft without requiring excessive alterations or changes in the wheel structure and landing gear and which may be retracted with the landing wheels with the vanes held and locked in a closed position so as to be removed from the slipstream when the plane is in flight, and thereby eliminate drag and loss of speed as a result thereof.

Another object of the invention is to provide a device of the above-mentioned character in which the landing wheels of an aircraft may be rotated so as to decrease the initial friction between the landing wheels and surface during landing operations and simultaneously decrease the tendency for the plane to up-end on its nose or overturn by reason of the excessive force required to rotate the wheels at the moment of contact with the landing surface.

Another object of the invention is to provide a device for imparting rotation to the landing wheels of aircraft during its ascension so as to eliminate drag on the plane and to facilitate the acceleration of the aircraft during the take-off.

Another object of the invention is to provide a device of the above-mentioned character which may be readily attached and detached relative to conventional aircraft landing wheels and to provide a device in which the movable vanes are feathered during a part of their movement through a predetermined arc so as to be removed from the airstream and eliminate drag and resistance by aspiratory effects.

Others objects and advantages of the invention will become apparent during the course of the following description of the accompanying drawing, wherein:

Figure 1 is a side elevational view of the device embodying the invention illustrating the arrangement of the movable vanes and the relative positions thereof with respect to the detachable housing;

Figure 2 is a vertical cross-sectional view taken on line 2—2 of Figure 1 looking in the direction of the arrows illustrating in detail the structural features of the movable vanes and the operating members therefor; and Figure 3 is a perspective view of an aircraft landing wheel showing the manner in which the landing device is removably attached thereto.

In the drawing, wherein for the purpose of illustrating the invention like reference characters will be employed to designate like parts throughout the same, the reference character 5 will be used to generally designate a circular housing member having a flat wall 6 of disc-like formation connected to a peripheral tapered portion 7 terminating in an annular flange 8. The housing 5 is adapted to supplement the fairing on the landing wheel W of an aircraft which is rotatably mounted on a strut S having a counterpart C which is hinged to the wing to swing on an axis parallel with the axis of the fuselage so as to cause the wheel W to be concealed in a well on the underside of the wing when the landing gear is retracted. This structure is embodied in present-day aircraft, including the wheel W, strut S and counterpart C as well as the wheel well in the underside of the wing.

Interposed between the disc-like housing 5 and wheel W is a disc 9 having a series of circumferentially spaced openings 10 adapted to align with openings 11 formed in the flange 8 so that bolts or other fastening elements 12 may be passed through the openings with the head thereof as at 13 received in a recess 14 and the opposite end of the fastener 12 as at 15 engageable with the wheel structure to facilitate the attachment of the housing to the wheel so as to be readily and easily detachable therefrom.

The disc-like housing 5 is provided on its front wall 6 with a series of crescent-shaped openings 16 spaced equal circumferential distances one from the other and arranged with the wide portion of the opening 17 extending in a direction counter to the direction of rotation of the wheel. A series of hinged vanes 18 are arranged in the crescent-shaped openings 16 and said vanes 18 include side walls 19 which are slightly tapered and are provided with flanges 20 adapted to be welded or otherwise secured to a hinge plate 21 hinged to the inner wall of the disc-like housing 5 by means of a suitable hinge structure 22. The hinge structure 22 may comprise a separate hinge member with one of its leaves as at 23 welded to the inner side of the flat wall 6 while the other leaf as at 24 may be welded to the hinge plate 21 as indicated by dotted lines in Figure 1. It is to be noted that the vanes 18 are hinged to swing on an axis offset from the radius of the wheel so as to facilitate the proper swinging of the vanes into and out of the openings 16 during the feathering motion thereof. The rear portions of the vanes 18 are cut away as at 25 so as to allow the escape of a predetermined amount of air pressure when the vanes are in their projected operative positions. The forward edge of the hinged vanes 18 are struck up as at 26 to provide air pockets adapted to project a slight distance beyond the face of the wall 6 so as to permit the entrapment of a small portion of air therein to cause the automatic opening of the vanes during a certain portion of their rotative travel.

Mounted on the inner wall of the housing 5 is a series of bracket members 27 formed on an annular base 28 welded or otherwise secured in place and said brackets 27 are positioned at suitable locations and are circumferentially spaced with a bracket adjacent each vane 18. Hinged to each of the brackets is a spring lever 29 by a pivot pin 30 and one end of the spring lever 29 as at 31 is adapted to engage a lip 32 formed on the flanged portion 20 of the vane 18. It is to be understood that there will be provided a spring lever 29 for each vane 18 and that the spring levers will be arranged so that their inner ends 33 are presented between a pair of disc members 34 and 35 mounted on an operating shaft or rod 36. The disc member 35 is anchored in place upon a reduced portion 37 of the shaft 36 while the disc 34 is free to slide thereon and is urged toward the disc 35 by means of a coil spring 38 which encircles the reduced portion 37 of the shaft and has one end engaging the movable disc 34 with the opposite end engaging an abutment or seat 39. The seat 39 is provided with a bore for receiving the inner reduced end 37 of the operating shaft 36 so as to permit free sliding movement thereof against the compression of the coil spring 38. The operating shaft 36 is adapted to project through the hub of the wheel W so that the offset extension thereof as at 40 will project a considerable distance through the hollow axle of the wheel W to the other side of said wheel. The free end of the offset portion 40 is provided with a buffer pad 41 adapted to engage the top wall of the wheel well in the aircraft wing so as to slide the rod 37 in the direction against the compression of the coil spring 38 when the landing wheel W is folded or retracted into the wheel well on the underside of the aircraft wing. Obviously, the pad member 41 may engage other parts of the aircraft wing structure such as stringers or the like, and the offset portion 40 of the shaft may be formed a predetermined length so as to allow sliding movement thereof a sufficient distance to cause the retraction of the vanes 18 but yet allow the complete retraction of the wheel into the wheel well. The disc 35 engages the cover plate 9 so as to limit the movement of the operating rod 36 a predetermined distance and to prevent the disengagement of the inner ends of the spring arms 33 from the operative position between the discs 34 and 35.

A spring member 42 is coiled about the pivot pin 30 and has one of its ends as at 43 received in an opening 44 in the side wall of the vanes while the opposite end as at 45 is hooked as at 46 about the outer end 31 of the spring arm 29. The spring 42 is intended to retract the vanes 18 during their rotation through an arc of approximately 180 degrees or during the cycle in which the reverse ends of the vanes are presented in the path of the airstream. The tension of the spring 42 is slightly less than the force required to open the vanes when the lip 26 is presented in the path of the airstream so as to allow the vanes to open during the remaining portion of the wheel cycle in which the lips 26 pass below a predetermined level with respect to the horizontal diameter of the wheel.

*Mode of operation of the invention*

When the landing wheel W is projected to its landing position, the operating rod 36 will be released so as to allow the spring 38 to force the same to the right whereupon the spring lever 29 will be rocked upon its pivot 30 to permit the free swinging movement of the vanes 18. When the vanes 18 are thus released, they are retained by the slight spring pressure of the spring member 42 so as to be retracted until a period in the cycle of the wheel wherein the lip 26 of each vane travels into the lower zone or arc of the wheel. As the vanes approach this position, the air stream engages beneath the lip 26 and forces the vane outwardly to provide a pocket or vane member 18 to receive the air stream and impart rotation to the wheel W. As the vanes travel through the upper cycle of their rotation, they are retracted by the slight pressure of the spring 42 so as to be completely removed from the air stream and to eliminate drag or aspiratory effects.

When the wheel W is retracted so as to be received in the wheel well on the underside of the aircraft wing, the plunger 41 engages the bottom of the wheel well and causes the operating rod 36 to be depressed against the action of the coil spring 38. When this occurs, the disc 35 engages the inner ends of the spring levers 33 to cause the same to be rocked simultaneously upon their respective pivots 30 so that their opposite ends 31 will engage the bent portions 32 of the flange 30 and swing these vanes 18 to their retracted positions where they will be held out of the path of the airstream when the landing wheel W is concealed and housed within the landing wheel well.

As the landing wheel W is lowered preparatory to landing, it is rotated at a high rate of speed so that when the plane lands, the wheels will be rotating and the friction created by the initial contact of the landing wheels will be eliminated by reason of this initial rotation of the wheels.

Similarly, while taking off, the vanes will be projected during their travel through the lower cycle of the wheel and the airstream will assist in rotating the wheels as the plane is accelerated so that a portion of the drag will be eliminated and the plane may take off with great ease and facility as well as land without the initial shock brought about by the contact of the landing wheels with the landing surface.

It is to be understood that the form of the invention herewith shown and described is to be taken as a preferred embodiment of the same and that various changes may be made in the shape, size and arrangement of parts without departing from the spirit of the invention or the scope of the subjoined claims.

What we claim is:

1. An airplane landing wheel, including wheel structure, a casing secured to said wheel having a series of circumferentially spaced openings, a series of wheel rotating buckets hinged to said casing adapted to project through said openings with their open ends presented to the slip stream during a portion of the wheel cycle, and resilient spring means for retracting said buckets as they travel through the remaining portion of the wheel cycle, said wheel rotating buckets being hinged for swinging movement on an axis such that the open ends will be directed opposite to the direction of wheel rotation.

2. An airplane landing wheel, including wheel structure, a casing secured to said wheel having a series of circumferentially spaced crescent-shaped openings, a series of wheel rotating buckets of substantially the same shape as said openings hinged to said casing adapted to project through said openings with their open ends extending in a direction opposite to the direction of wheel rotation, resilient spring means for retracting said buckets as they travel through a portion of the wheel cycle, and pressed out lip portions on the buckets adjacent the open ends thereof for initiating projection of said buckets so that said buckets will be presented to the slipstream during the remaining portion of their cycle, said casing being removably secured to the wheel structure and said buckets being located at circumferentially spaced positions.

3. An airplane landing wheel, including wheel structure, a casing secured to said wheel having a series of circumferentially spaced crescent-shaped openings, a series of wheel rotating buckets of substantially the same shape as said openings hinged to said casing adapted to project through said openings with their open ends presented to the slipstream throughout a portion of said wheel cycle and disposed in a direction opposite to the direction of wheel rotation, resilient spring means for retracting said buckets as they travel through the remaining portion of the wheel cycle, and means independent of said spring means for maintaining said hinged buckets in a retracted position when the landing wheel is inoperative.

4. An aircraft landing wheel comprising a wheel structure having a tire mounted thereon, a disc-like housing removably secured to said wheel structure having a series of circumferentially spaced apertures of triangular formation, a series of wheel-rotating bucket members hingedly secured to the casing of substantially the same shape as said buckets with their open end portions projectible and retractable through said apertures, said vane members being arranged and positioned so that the open ends thereof extend in a direction opposite to the direction of wheel rotation so as to be presented to the airstream of said air-craft during a portion of the wheel cycle when projected and means for holding said buckets removed from said airstream during the remaining portion of the wheel cycle with their open ends confined in said housing.

5. An aircraft landing wheel comprising a wheel structure having a tire mounted thereon, a disc-like housing removably secured to said wheel structure having a series of circumferentially spaced apertures of triangular formation, a series of wheel-rotating bucket members hingedly secured to the housing with their open end portions projectible and retractable through said apertures, said bucket members being arranged and positioned whereby the open ends thereof will be presented to the airstream of said aircraft in a direction opposite to the direction of wheel rotation during a portion of the wheel cycle when projected and removed from said airstream during the remaining portion of the wheel cycle, struck-up lip portions formed on the outer walls of the bucket members for causing the same to be initially extended into said airstream and resilient means for retracting said vane members into said disc-like housing.

6. An aircraft landing wheel comprising a wheel structure having a tire mounted thereon, a disc-like housing member removably secured to said wheel structure, said housing having a series of circumferentially spaced openings in the radial wall thereof equidistantly positioned from the axis of said wheel and on a common radius, a series of wheel rotating buckets of substantially the same shape as the openings pivotally secured to said housing and shaped to project through said openings with their open ends extending in a direction opposite to the direction of wheel rotation and into the airstream of said aircraft during a portion of the wheel cycle, means on the bucket members for causing said buckets to be initially projected through said openings into the path of the airstream, and yielding spring means for causing said bucket members to be retracted from said airstream during the remaining portion of said wheel cycle.

7. An aircraft landing wheel comprising a wheel structure having a tire mounted thereon, a disc-like housing member removably secured to said wheel structure, said housing having a series of circumferentially spaced triangular-shaped openings in the radial wall thereof equidistantly positioned from the axis of said wheel and on a common radius, a series of wheel rotating buckets pivotally secured to said housing shaped to project through said openings with their open ends extending in a direction opposite to the direction of wheel rotation and arranged to be presented to the slipstream of the aircraft during a portion of the wheel cycle, means on the side wall of each of said buckets for causing said vanes to be initially projected through said openings into the path of the airstream, yielding spring means for causing said bucket members to be retracted from said airstream during the remaining portion of said wheel cycle, and means independent of said yielding spring means for maintaining said vane members within said housing when the landing wheel is retracted within a wheel well in a portion of said aircraft.

8. An aircraft landing wheel comprising a wheel structure having a tire mounted thereon, a disc-like housing member removably secured to said wheel structure, said housing having a series of circumferentially spaced triangular-shaped openings in the radial wall thereof equidistantly positioned from the axis of said wheel and on a common radius, a series of wheel rotating buckets pivotally secured to the radial wall of said housing shaped to project through said openings with their open ends extending in a direction opposite to the direction of wheel rotation and to be presented to the airstream during a portion of the wheel cycle, projecting lip portions on the outer wall surfaces of said buckets adjacent the open ends thereof for causing said buckets to be projected through said openings into the path of the airstream, yielding spring means for causing said vane members to be retracted from said airstream during the remaining portion of said wheel cycle, and a disc-closure plate interposed between the disc-like housing and said wheel to conceal said spring means and pivotal connections of said bucket members whereby said spring members and pivotal connections will be protected against moisture and foreign matter.

9. An aircraft landing wheel comprising a wheel structure having a tire mounted thereon, a disc-like housing member removably secured to said wheel structure, said housing having a series of circumferentially spaced triangular-shaped openings in the radial wall thereof equidistantly positioned from the axis of said wheel and on a common radius, a series of wheel-rotating buckets pivotally secured to said housing and shaped to conform to said openings and to project through said openings with their open ends directed in a direction opposite to the direction of wheel rotation and presented to the airstream of said aircraft during a portion of the wheel cycle, means on the bucket member for causing said buckets to be initially projected through said openings into the path of the airstream during said portion of said wheel cycle, means for causing said bucket members to be retracted from said airstream during the remaining portion of said wheel cycle, means independent of said last-named means for holding said bucket members in a retracted position when said aircraft wheel is stored in a wheel well in a portion of said aircraft and means for automatically releasing said last-named means when the landing wheel is in its projected operative position.

10. An aircraft landing wheel comprising a wheel structure having a tire mounted thereon, a disc-like housing member removably secured to said wheel structure, said housing having a series of circumferentially spaced triangular-shaped openings in the radial wall thereof equidistantly positioned from the axis of said wheel and located on a common radius, a series of wheel rotating buckets pivotally secured to the radial wall of said housing and shaped to project through said triangular openings with their enlarged open end portions extending in a direction opposite to the direction of wheel rotation and disposed to be presented to the airstream of said aircraft during a portion of the wheel cycle, lip projections on the open ends of bucket members for causing said bucket members to be projected through said openings into the path of the airstream, spring means for retracting said bucket members during the remaining portion of said wheel cycle, a spring loaded plunger operator carried by said disc-like housing adapted to engage a portion of said aircraft when the wheel is retracted, and a lever for each bucket member engageable with a projection on said plunger to maintain said vane members within the housing and out of said airstream when said landing wheel is stored in a wheel well in a portion of said aircraft.

JOSEPH KEREZI.
LYNN C. MAYSILLES.